United States Patent [19]

Foxhall

[11] 3,824,849

[45] *July 23, 1974

[54] INFLATION DEVICE

[75] Inventor: Ollie C. Foxhall, Bethany, Okla.

[73] Assignee: Joco, Incorporated, Oklahoma City, Okla.

[*] Notice: The portion of the term of this patent subsequent to Mar. 13, 1991, has been disclaimed.

[22] Filed: June 5, 1972

[21] Appl. No.: 259,932

Related U.S. Application Data

[63] Continuation-in-part of Ser. No. 99,631, Dec. 18, 1970.

[52] U.S. Cl. .............................................. 73/146.8
[51] Int. Cl. ............................................ B60c 23/04
[58] Field of Search.......... 73/146.8, 419; 116/34 R, 116/70; 137/227, 228

[56] References Cited
UNITED STATES PATENTS
3,592,218  7/1971  Guy.................................. 116/34 R
3,720,224  3/1973  Foxhall .............................. 137/227

Primary Examiner—Donald O. Woodiel
Attorney, Agent, or Firm—Dunlap, Laney, Hessin, Dougherty & Codding

[57]  ABSTRACT

A tire pressure indicator and inflation device which includes an outer housing having a bore and counterbore formed therein, and an internal housing or sleeve assembly positioned in the bore of the outer housing. The internal housing or sleeve assembly has a threaded hollow interior for connecting the internal housing assembly to the valve stem of a pneumatic tire. The internal housing assembly has an end plate which extends across and closes one end thereof and which carries a valve core depressor element. An elongated pressure indicator element carrying a piston at one end thereof is slidably mounted within the counterbore of the outer housing so that the piston seals against the internal wall of the outer housing in the counterbore. The piston and associated pressure indicator element are biased by a spring positioned between the piston and an internal shoulder on the outer housing to a position adjacent the internal housing.

3 Claims, 14 Drawing Figures 3,824,849

INFLATION DEVICE

RELATED APPLICATION

This application is a continuation-in-part of U.S. application Ser. No. 99,631 on "Tire Pressure Indicator and Inflation Device" filed Dec. 18, 1970.

BACKGROUND OF THE INVENTION

1. Field of the Invention

This invention relates to the field of pneumatically actuated pressure gauges, and more particularly, to structures for use in connection with pneumatic tires, and including, in combination, a pneumatic pressure indicator and an inflation valve facilitating inflation of the tire.

2. Brief Description of the Prior Art

The use of automobiles having pneumatic ground engaging tires has greatly increased throughout the world in recent years. Optimum operation of these vehicles requires proper care of the tires by which they contact the ground. Proper care of tires entails operation of the vehicle with optimum pneumatic pressure maintained within the tires at all times.

To the end of permitting pneumatic tire life to be extended, and to facilitate the ease with which the vehicle operator may maintain a constant awareness of the status of pneumatic pressure within the tires of his vehicle, a great many devices have been heretofore proposed for constantly indicating to the vehicle operator or to service station personnel, the pneumatic pressure obtaining within the tire. The efforts to provide a device which will perform this function have yielded mechanisms ranging in complexity from simple pressure responsive screw-on indicators of few parts, which provide a visual indication of pressure within the tire to one standing beside the tire, to remote control devices which, by the use of complicated and expensive electrical or pneumatic circuitry, undertake to provide a continuous indication to the operator of pressure in the tires during operation of the vehicle, by communicating a visual signal to the instrument panel or dashboard of the vehicle.

The pressure indicator devices generally function in cooperation with the conventionally provided valve stem, which projects outwardly from the periphery of the tire as manufactured and which functions to facilitate inflation of the tire, and checking of pressure by the use of hand gauges carried by service station operators. Because of this cooperation, which usually takes the form of screwing or attaching the continuously indicating pressure gauge to the valve stem, it is necessary with many of the simpler pressure indicating devices, as well as with a great many of the more complicated ones, to detach or disconnect the pressure indicating device from the valve stem when it is necessary to inflate or deflate the tire. Stated differently, devices of this type, as they have been very often proposed, do not provide any way by which the tire pressure can be adjusted without the removal of the continuously indicating pressure gauge from the tire.

There have been, from time to time, attempts to alleviate the inconvenience of removing the pressure indicating device or gauge from the valve stem for the purpose of inflating or deflating the tire. In general, the efforts to overcome this disadvantage, based in the necessity for such removal, have taken the form of incorporating some type of depressible auxiliary valve stem or core within the pressure gauge or indicator, so that when a conventional inflation chuck carried at the end of an air hose is pressed over a portion of the air gauge to depress the auxiliary valve stem carried therein, ports are opened which place the chuck in pneumatic communication with the interior of the tire and permit inflation to proceed in the normal manner.

Despite the fact that, over many years, there have been a great many patents issued upon a wide assortment of pressure indicating devices, and upon such devices in combination with auxiliary inflation structure, one still does not, to this day, perceive any widespread acceptance or use of either a simple pressure gauge for continuously indicating tire pressure at a glance, or the more sophisticated devices which combine an inflation function with a pressure indication function. The absence of these devices from the field of actual usage seems only attributable to either the lack of mechanical reliability, and a relatively short service life of the devices, or to the fact that the cost of manufacturing the more sophisticated and intricate devices prices them beyond the market. It is submitted that the desire of vehicle operators and service station personnel for this convenience and assurance of proper tire care is such that, while such devices are desirable, and would admittedly make a valuable contribution to tire maintenance and vehicular safety, the interest and desire to obtain these objectives more effectively than at present has not, to the present data, warranted the cost of acquiring and installing those devices which can be depended on to reliably perform the functions sought.

BRIEF DESCRIPTION OF THE PRESENT INVENTION

The present invention provides a relatively simple and inexpensively constructed pressure gauge and tire inflation device which is believed to be more simple and less costly than any known to the prior art which are capable of performing equivalent functions. The apparatus of the present invention is simple to the extent of consisting of very few parts or elements which can be easily and quickly assembled (manually, if desired). Each of the parts is ruggedly constructed, and the device as a whole, when assembled, performs effectively to accurately provide an indication at any time of pressure within a pneumatic tire, and to facilitate inflation of the tire with even greater ease than the tire may be inflated when using the valve stem provided as original integrated equipment forming a portion of the tire. Other advantageous aspects characterize the invention which achieve several important objectives, and such objectives and advantageous aspects are more particularly hereinafter described.

Structurally, the pressure indicator and tire inflation device of the invention may be broadly described as including an outer housing, an inner housing or sleeve assembly, an elongated pressure indicator element carrying a piston at one end thereof, and a spring positioned between the piston and outer housing. The outer housing includes a relatively large diameter cylindrical bore which intersects an elongated, relatively smaller diameter counterbore. The outer housing is open at its opposite ends. The inner housing or sleeve assembly is a hollow cylindrical element made of a resilient material, and is positioned within the relatively large diameter bore of the outer housing. The inner housing assembly includes a fluid transmissive end plate or reaction plate extending across one end thereof.

In one embodiment, a generally cylindrical side wall is connected to the end plate through a deformable portion. The generally cylindrical side wall of the inner housing is keyed to the wall of the outer housing to prevent rotation of the inner housing within the bore of the outer housing. Projecting in opposite directions from the opposite sides of the fluid transmissive end plate which extends across and closes one end of the inner housing are a pair of core depressor projections or shafts. The core depressor projections which projects outwardly or away from the inner housing, and into the counterbore formed in the outer housing, contacts the face of the piston carried on the end of the elongated pressure indicator element. The piston is slidably and sealingly positioned within the counterbore of the outer housing and forms a stop against which abuts one end of a helical spring positioned within this counterbore. The opposite end of the spring contacts an internal shoulder formed by an inturned flange located at the end of the counterbore within the external housing.

In another embodiment of the invention, the deformable portion of the inner housing or sleeve assembly is replaced by a helical compression spring which extends between the cylindrical side wall and the reaction plate.

In the use of the device, the internal housing is screwed on the externally threaded valve stem conventionally provided in conjunction with the tire. The external housing can then be moved relative to the internal housing to deform the resilient material of the internal housing in such a way that the valve core depressor projection or shaft which projects into the internal housing will contact the valve core of the regular tire valve. This movement opens this valve to permit the existing air pressure within the tire to be communicated to the under side of the piston forming a portion of the pressure indicator and inflation device of the invention. The elongated pressure indicator element is then forced out of the external housing to an extent which is correlated to the air pressure within the tire. The pressure indicator element functions also as a valve core when an air inflation chuck is placed over the end of the external housing which carries the counterbore. Depression of the pressure indicator element by the core depressor projection of the chuck moves the piston to a position allowing pneumatic communication between the inflation chuck and the interior of the tire.

A broad object of the invention is to provide an inexpensive yet efficiently functioning and easily used device for quickly and accurately indicating at any time, the inflation pressure of a pneumatic tire to which the device is attached, and to permit, at any time and without detachment of the device from the tire, the inflation or deflation of the tire to a desired pressure level.

Another object of the invention is to provide a combination pressure gauge and tire inflation device which can be used, as a result of its geometry, to effectively extend the overall length of the valve provided with pneumatic tires for the purpose of inflating or deflating the tires, thereby improving access to the valve for purposes of tire inflation.

A more specific object of the invention is to provide a device for quickly and easily providing an accurate indication of the pressure carried in a pneumatic tire, and to permit inflation and deflation of the tire at any time without the necessity for removing the device from the valve stem of the tire.

Another object of the invention is to provide a pressure indicating and inflation device which can be easily installed on the valve stems of pneumatic tires, even under conditions where such valve stems have become retracted within chrome discs or hub caps carried by the wheels of a vehicle upon which the tires are mounted.

Yet another object of the invention is to provide a combination pressure indicating and tire inflation device which can be quickly and easily adjusted in its structural make-up to adapt the device to the measurement of widely varying pressure ranges as are experienced with different types of pneumatic tires, different vehicle operator preferences, and different types of over-the-road vehicles.

Other objects and advantages of the invention will become apparent as the following detailed description of the invention is read in conjunction with the accompanying drawings which illustrate the invention.

DETAILED DESCRIPTION OF A PREFERRED EMBODIMENT OF THE INVENTION

Figure 1:
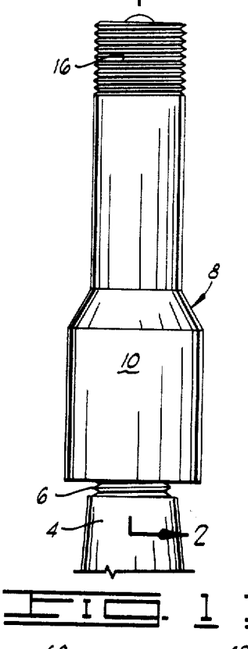
FIG. 1 is a side elevation view of the combination pressure indicator and inflation device of the invention as the device appears when mounted on the valve stem of a pneumatic tire.

Referring initially to FIG. 1 of the drawings, shown therein is a conventional rubber coated valve stem 4 of the type which is provided on pneumatic tires as now manufactured and sold for use on automobiles. The valve stem 4 has an externally threaded outer end portion 6 which is provided for the securement of a valve cap thereto in normal usage. To facilitate the mounting of the present invention on the valve core 4, the conventional valve cap has been removed from the externally threaded portion 6, and the pressure indicator inflation device of the present invention has been threadedly secured to the valve stem 4 and is designated generally by reference numeral 8. The pressure indicator inflation device includes an outer housing 10. The outer housing 10 is enlarged at one end to accommodate interiorly thereof, a relatively large diameter bore 12. At its other end, a relatively small diameter portion of the outer housing 10 accommodates a relatively small diameter counterbore 14. At the opposite end of the housing from the enlarged portion in which the bore 12 is located, the outer housing 10 is externally threaded with threads 16 to accommodate a valve cap (not shown). The purpose and usage of such valve cap will be well understood in the art.

Figure 2:
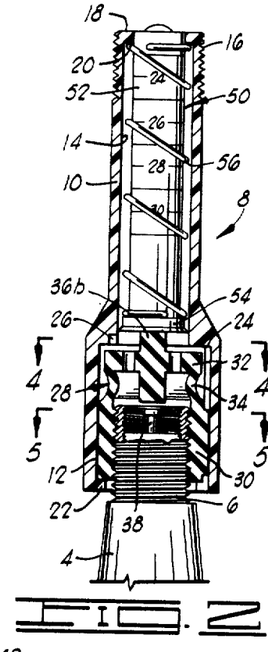
FIG. 2 is a longitudinal sectional view of the pressure indicator and inflation device depicted in FIG. 1, with such section being taken along the line 2—2 of FIG. 1.

In referring to FIG. 2 of the drawings, it will also be perceived that the outer housing 10 is provided with an inturned flange 18 at the end thereof which carries the threads 16, such inturned flange providing a downwardly facing shoulder 20 disposed within the counterbore 14. At its end opposite the end carrying the threads 16, the outer housing 10 also carries a second inturned flange 22. The purposes of the inturned flanges 18 and 22 will be hereinafter explained in greater detail. At the intersection of the bore 12 with the counterbore 14, the outer housing 10 forms a downwardly facing shoulder 24, and it will be noted in referring to FIG. 4 that the annular shoulder 24 is partially relieved at three points therearound to provide passageways 26 which, during the operation of the device as explained hereinafter, provide air flow channels between the counterbore 14 and the bore 12. Although the outer housing 10 may be constructed of various materials, it is preferably constructed of a synthetic resin having elastomeric properties and relatively high mechanical strength.

Positioned within the outer housing 10 in the bore 12 is an inner housing designated generally by reference numeral 28. The inner housing 28 includes a cylindrical side wall 30 which carries an internal thread facilitating the threading of the inner housing upon the threaded portion 6 of the valve stem 4. The inner housing 28 further includes at one end thereof an end plate 32 which extends across the closes the end of the inner housing. Interconnecting the end plate 32 and the cylindrical side wall 30 is a relatively thin deformable portion 34.

The end plate carries a pair of aligned valve core depressor projections 36a and 36b. The valve core depressor projection 36a will be referred to as the interior projection, and it projects into the hollow interior of the inner housing 28 into proximity to the conventional valve core 38 carried by, and forming a portion of, the conventional valve stem 4 of the tire. The outer valve core depressor projection 36b projects from the inner housing 28 into the counterbore 14 formed in the outer housing 10. One or more ports or passageways 40 (two being shown in the illustrated embodiment of the invention) are formed through the end plate 32 for a purpose hereinafter described.

Figures 3, 4, 5:
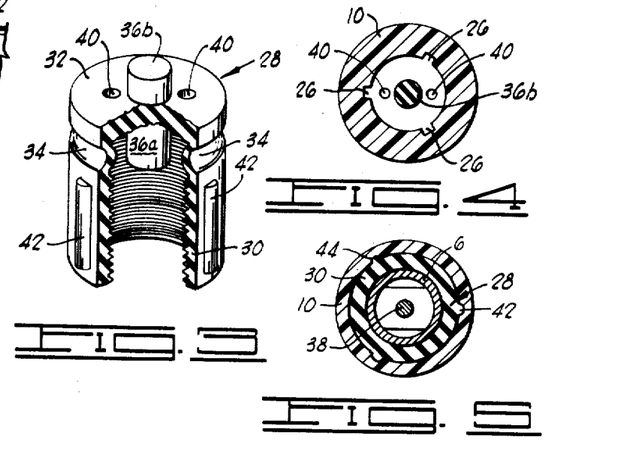
FIG. 3 is a perspective view of the inner housing constituting one element of the pressure indicating and inflation device of the invention, with a part of the inner housing broken away to show more clearly the appearance of the interior thereof.
FIG. 4 is a sectional view taken along line 4—4 of FIG. 2.
FIG. 5 is a sectional view taken along line 5—5 of FIG. 2.

The cylindrical side wall 30 of the inner housing 28 carries a plurality of axially extending ribs 42, which ribs register with complementary grooves 44 formed in the internal wall of the enlarged end portion of the outer housing 10 as best illustrated in FIG. 5.

The inner housing 28 is preferably a unitary or integrally formed unit which is fabricated from an elastomeric material, such as rubber. The elastic properties of the material used are particularly important to the proper functioning of the inner housing 28 in the overall operation of the pressure indicator and inflation device 8 of the invention, and it is important that the deformable portion 34 be more easily collapsed or more yieldable than the remaining portions of the inner housing 28. The inner housing 28 is snugly fitted within the core housing 10 so that the cylindrical side wall 30 preferably frictionally engages the internal wall which defines the bore 12. It will be noted that in the relaxed or inoperative position of the pressure indicating and inflation device 8 as shown in FIG. 2, some clearance exists between the end plate 32 and the shoulder 24 of the outer housing 10. There is also clearance between the outer periphery of the end plate 32 and the cylindrical boundary wall of the bore 12 within the outer housing 10.

Positioned within the counterbore 14 of the outer housing 10 is an elongated pressure indicator element designated generally by reference numeral 50. The pressure indicator element is cylindrical in configuration and of substantially smaller diameter than the diameter of the counterbore 14. It is also apparent that the diameter of the pressure indicator element 50 permits it to project through the opening in the flange 18 at one end of the outer housing 10. The pressure indicator element 50 carries a series of graduations 52 and other indicia to provide a scale which may be read in a manner hereinafter described to ascertain the air pressure within the tire.

At its internal end which is located most nearly to the inner housing 28, the elongated pressure indicator element 50 carries a cylindrical piston 54. The cylindrical piston 54 is provided adjacent its face with an annular, resilient sealing member 54a which sealingly contacts the internal wall of the housing 10 which defines the counterbore 14. The sealing member 54a thus maintains sealing contact with the housing 10 during reciprocating axial movement within the housing of the elongated pressure indicator element 50 and piston 54.

In a preferred construction of the pressure indicator and inflation device 8 of the invention, the elongated pressure indicator element 50 and the piston 54 are integrally formed and are preferably fabricated or manufactured from a hard elastomeric material such as hard rubber. Other materials may be used, however, and though such construction is less desirable, the piston 54 may be manufactured as an element which is separate from the elongated pressure indicator element 50, and which is secured thereto by an adhesive or suitable fastening devices.

Positioned around the elongated pressure indicator element 50 and within the annulus formed between this element and the housing 10 is an elongated helical compression spring 56. The elongated compression spring 56 has one of its ends in abutting contact with the upper side of the piston 54. The opposite end off the spring 56 bears against the shoulder 20 constituting the under side of the inturned flange 18. In the position on the pressure indicator and inflation device 8 depicted in FIG. 2, the device is in its at rest or inoperative position, and in this position, the spring 56 is under slight compression and resiliently biases the elongated pressure indicator element 50 and the piston 54 attached thereto to a position such that the face of the piston bears against the upper end of the outer valve core depressor projection 36b. Sufficient pressure is not exerted by the spring 56, however, to deform any portion of the inner housing 28 from its normal unstressed configuration.

OPERATION

In the use of the pressure indicator and inflation device 8 of the invention, the device is first screwed down upon the threads 6 of the valve stem 4 to a position such that the inner valve core depressor projection 36a is spaced slightly from the valve core 38. With the pressure indicator and inflation device 8 thus attached to the valve stem 4, the assembly appears as depicted in FIGS. 1 and 2 of the drawings.

For the purpose of checking the air pressure within the tire which carries the valve stem 4, the vehicle operator or service station attendant may then grip the outer housing 10 of the device 8 and force the outer housing toward the valve stem 4. This application of force causes relative movement between the outer housing 10 and the inner housing 28 which is threaded upon the threads 6 of the valve stem 4. As the outer housing 10 moves upon the inner housing 28, the shoulder 24 inside the outer housing 10 comes in contact with the end plate 32 of the inner housing 28. Further movement of the outer housing 10 then causes resilient deformation of the deformable portion 34 of the inner housing 28 and concurrently causes the end plate 32 and the valve core depressor projections 36a and 36b which it carries to move toward the valve stem 4. This movement brings the inner valve core depressor projection 36a into contact with the valve core 38 and depresses the valve core to open the valve of the tire in a manner well understood in the art. This opening of the valve located within the valve stem 4 places the interior of the tire which carries the valve stem in pneumatic communication with the interior of the inner housing 28. Air may thus flow through the inner housing 28 and through the passageways 40 formed in the end plate 32 thereof into the outer housing 10.

Figure 6:
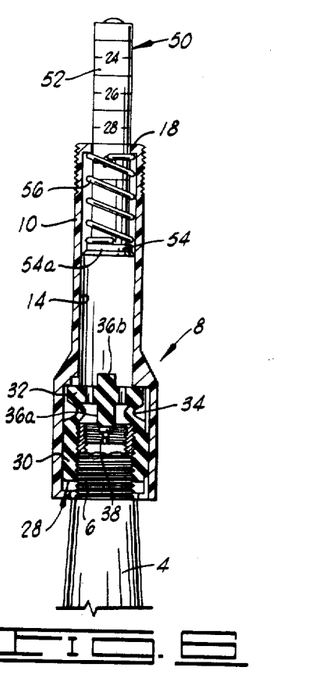
FIG. 6 is a sectional view similar to FIG. 2, but showing the pressure indicator and inflation device of the invention as it appears when it is in a status effective to permit the inflation pressure of a pneumatic tire to which it is attached to be measured.

The air pressure present within the tire thus comes to act against the face of the piston 54, and this piston is forced by air pressure outwardly within the counterbore 14. In undergoing an outward movement in the counterbore 14, the piston 54 forces the elongated pressure indicator element 50 ahead of it, so that the pressure indicator element is extended outwardly from the relatively small diameter end of the outer housing 10. Concurrently with this movement, the helical compression spring 56 undergoes compression and increasingly opposes the pressure developed against the face of the piston 54 by pneumatic pressure acting from within the tire. Eventually, a point of balance between the bias of the spring 56 and the pneumatic pressure within the tire is reached, and movement of the piston 54 and the elongated pressure indicator element 50 ceases. Stated differently, an equilibrium position is reached in which an amount of the elongated pressure indicator element 50 extends out of the outer housing 10 which can be correlated to the air pressure which is present within the tire. It will, at this time, be possible to read the graduations 52 upon the pressure indicator element 50 to determine the air pressure present within the tire. The described status of the pressure indicator and inflation device 8 of the invention is depicted in FIG. 6 where an air pressure reading of 30 pounds is being registered by the elongated pressure indicator element.

When the outer housing 10 is released after it has been moved downwardly relative to the inner housing 28 to obtain a pressure reading, the inner housing 28 will expand due to the resiliency of the material from which it is constructed, and the relative positions of the inner and outer housings as depicted in FIG. 2 will be re-established. This is an equilibrium position in which the forces exerted by the spring 56 and inner housing 28 through the outer valve core depressor 36b position the piston 54 as shown in FIG. 2. At this time, the air which is entrapped within the outer housing 10 beneath the piston 54 may slowly bleed from the outer housing by passage around the outer periphery of the end plate 58 and by the deformable portion 34, and past the cylindrical side wall 30. It will thus become possible, soon after a pressure reading has been taken, to press the outer end of the elongated pressure indicator element 50 down into the counterbore 14 of the outer housing 10 to reset the device either for a subsequent pressure reading, or for inflation or deflation of the tire.

Figure 7:
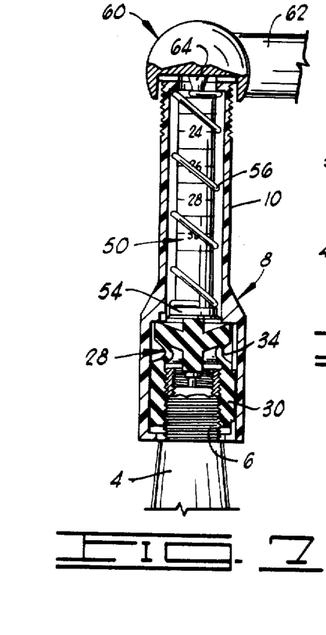
FIG. 7 is a view similar to FIG. 6, but showing an alternate status of the pressure indicator and inflation device as the device is positioned for the purpose of inflating a tire to which it is attached.

The manner in which the pressure indicator and inflation device 8 of the invention is utilized for inflating or deflating the tire as best illustrated in FIG. 7 of the drawings. As is customary for the purpose of tire inflation a tire inflation chuck, designated generally by reference numeral 60, is utilized, such chuck being carried on the end of a pneumatic pressure hose 62. The construction of a chuck of this type is such that a core depressor element 64 is provided in the center of the chuck, and functions to depress a valve core to permit injection of air under pressure to proceed.

When the chuck 60 is used to inflate a tire through the pressure indicator and inflation device 8 of the present invention, the chuck is placed over the device so that a portion of the chuck bears against the outer housing 10 and forces this housing downwardly on the inner housing 28 until the shoulder 24 comes in contact with the end plate 32. Concurrently with this movement, the core depressor element 64 comes in contact with the end of the elongated pressure indicator element 50 which is adjacent the flange 18 of the outer housing 10. The pressure indicator element 50 is forced inwardly by the core depressor element 64 of the chuck 60, and in being forced inwardly, carries the piston 54 attached to its inner end toward the bore 12 in the outer housing 10.

The movement of the pressure indicator element 50 is such that the piston 54 and the sealing element 54a which it carries are moved in line with, or slightly past, the passageways 26 formed in the shoulder 24 of the outer housing 10. When the piston 54 and sealing element 54a have reached this position, pneumatic communication exists between the annulus around the elongated pressure indicator element 50 and the passageways 40 formed in the end plate 32 of the inner housing 28. This status of the pressure indicator and inflation device 8 is shown in FIG. 7.

As is well understood in the art, the described contact between the core depressor element 64 and the elongated pressure indicator element 50 permits air under relatively high pressure to flow from the air chuck 60 into the open annulus which surrounds the pressure indicator element 50 within the outer housing 10. This pressurized air flows through the passageways 26 in the shoulder 24 and through the passageways 40 in the end plate 32. The described movement of the pressure indicator element 50 and the piston 54 has effectively moved the inner valve stem depressor projection 36a against the valve core 38 of the valve stem 4 to open the tire valve at this time. Thus the pressurized air is free to flow into the tire and increase the inflation pressure.

It is believed that, from the description of the procedure of inflating the tire through the pressure indicator and inflation device 8 of the present invention, it will now be apparent how deflation may be accomplished. The elongated pressure indicator element 50 is again pushed inwardly within the outer housing 10 by any suitable means until the status depicted in FIG. 7 is attained. Since communication is, at this time, established between the interior of the tire and the annulus which surrounds the pressure indicator element 50, air under pressure from the tire is free to flow outwardly to the atmosphere to deflate the tire, or to reduce the pressure therein.

From the foregoing description of the invention, it will have become apparent that a relatively simple, reliable and efficient pressure indicator and inflation device has been proposed by the invention. It is pointed out that only four integral parts are required in the construction of the device of the invention, and that these parts may be quickly and easily assembled manually. In the manual assembly sequence, the spring 56 is first placed around the elongated pressure indicator element 50 with one of its ends bearing against the piston 54. The thus assembled spring and pressure indicator element are then inserted through the opening in the enlarged end of the outer housing 10, and allowed to drop through the outer housing until the spring comes to rest against the flange 18, and the pressure indicator element 50 is thus positioned predominantly within the counterbore 14 of the outer housing. The inner housing 28 may then be pressed through the opening in the enlarged end of the outer housing 10 until it snaps into place with the inturned flange 22 hooking over the end of the inner housing 28 adjacent the open end of the outer housing. In pressing the inner housing 28 into position, the outer depressor projection 36b carried on the end plate 32 will force the piston 54 into the counterbore 14 against the opposition of the compression spring 56. Thus, the proper balance of forces is achieved, and the status of the assembly shown in FIG. 2 is accomplished.

It may be pointed out that one of the advantages of the present invention is that the overall length of the pressure indicator and inflation device 8 of the invention permits a retracted or withdrawn valve stem 4 to be reached while gripping the device 8 at the threaded end 16 thereof. The device 8 may be screwed upon the valve stem 4 when it is so reached because the ribs 42 key the inner housing 28 to the outer housing 10 in such manner as to prevent rotation of the inner housing within the outer housing.

THE EMBODIMENT ILLUSTRATED IN FIGS. 8–14

Figures 8, 9:
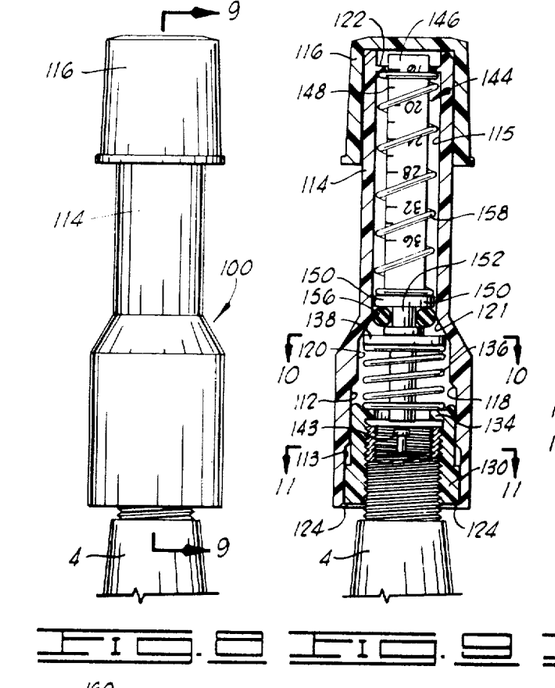
FIG. 8 is a view similar to FIG. 1, but illustrating a modified embodiment of the invention.
FIG. 9 is a longitudinal sectional view of the embodiment of the pressure indicator and inflation device depicted in FIG. 8, with said section being taken along line 9—9 of FIG. 8.

The embodiment of the invention illustrated in FIG. 9 is shown mounted on a conventional valve stem 4 by threading on the outer end portion of the valve stem as previously described. The pressure indicator inflation device includes an outer housing 100. The outer housing 100 is enlarged at one of its ends to accommodate interiorly thereof, a relatively large diameter bore 112. The portion 113 of this bore adjacent the valve stem 4 is of hexagonal cross sectional configuration, while the remainder of the bore is circular in cross sectional configuration.

Adjacent the other end of the housing 100, the housing has an elongated neck portion 114 which accommodates a relatively small diameter counterbore 115. A friction cap 116 is pressed over the open upper end of the relatively small diameter portion 114. Between the relatively small diameter counterbore 115 and the bore 112,, the internal passageway through the housing 100 is stepped at two locations. Thus, a shoulder 118 is provided at the end of the bore 112 opposite the hexagonally shaped cross sectional portion of this bore, and a bore 120 of smaller diameter extends from this shoulder to a tapered or beveled shoulder 121 which intersects the relatively small diameter counterbore 115.

Adjacent the open end of the neck portion 116, the housing, which is formed of rubber or a plastic material, has molded integrally therewith, an annular, inwardly projecting seat 122 or flange. The in-turned seat or flange 122 provides a downwardly facing shoulder disposed within the counterbore 115. At its opposite end from the neck portion 114, the housing 100 also carries a second in-turned flange or seat 124.

Positioned within the outer housing 100 in the bore 112 is an inner housing or sleeve designated generally by reference numeral 126. The inner housing 126 includes a cylindrical side wall 128 and an end portion 130 which is formed contiguously to, and integrally with, the cylindrical side wall. The end portion 130 has a hexagonally configured outer wall which is dimensioned to mate with and engage the hexagonally cross sectioned portion 113 of the bore 112. A bore of uniform diameter extends into the inner housing or sleeve 126 and is threaded over a major portion of its length to facilitate threaded engagement with the upper end of the valve stem 4.

At its end opposite the end joined to the end portion 130, the cylindrical side wall 128 has formed thereon, a radially inwardly extending annular seat 134. A helical spring 136 has one of its ends bearing against the seat 134 and bears at its opposite end against a reaction plate 138. The reaction plate 138, as shown in FIG. 9, is of slightly less diameter than the bore 120, but is of larger diameter than the small diameter counterbore 115 so that the reaction plate is forced by the spring 136 against the tapered or beveled shoulder 121. The reaction plate 138 is provided with a plurality of small holes 140 or orifices extending therethrough and surrounding a valve core depressor shaft or projection 142 which projects centrally from the reaction plate so as to be aligned with the core 143 of the valve stem 4 to which the pressure indicator and inflation device is threadedly connected.

It may be here pointed out that the inner housing or sleeve 126 which includes the cylindrical side wall 128 and end portion 130 is preferably an integrally formed or molded unit made from an elastomeric material such as rubber, or from a synthetic resin. The same type of construction is characteristic of the reaction plate 138 and stem depressor shaft or projection 142. The end portion 130 of the sleeve 126 is slidably mounted in the mating hexagonally shaped portion of the bore 112 so that the sleeve may slide axially within the outer housing 100, but is keyed by the hexagonal mating structure against rotation about the axis thereof.

Located within the counterbore 115 of the outer housing 100 is an elongated pressure indicator assembly designated generally by reference number 144. The pressure indicator assembly 144 is movable axially within the counterbore 115 and includes a generally cylindrical gauge element 146 which carries a series of graduations 148 and other indicia to provide a scale which may be read in a manner hereinafter described to ascertain the air pressure within the tire.

At its internal end which is located most nearly to the inner housing or sleeve 126, the pressure indicator assembly 144 includes piston means formed in part by an annular plate 150 secured to the inner end of the gauge element 146, and a small connector neck 152 which connects the plate 150 to a seal retainer plate 154. Positioned between the plate 150 and the seal retainer plate 154 around the neck 152 is an annular O-ring seal 156. The O-ring seal 156 is dimensioned to bear resiliently against the internal wall of the elongated neck portion 114 which defines the counterbore 115, and to sealingly engage this internal wall. Positioned around the gauge element 146 and extending between the plate 150 and the seat or flange 122 is a helical compression spring 158.

OPERATION OF THE EMBODIMENT DEPICTED IN FIGS. 8–14

The general operation of the pressure indicator and inflation device shown in FIGS. 8–14 is very similar to the operation of that embodiment of the invention which has been shown in FIGS. 1–7 and hereinbefore described. In the use of the modified embodiment more recently described, the device is first screwed down on the threads of a valve stem 4 to a position such that the stem depressor shaft 142 is spaced slightly from the valve core 143. This relationship is illustrated in FIGS. 8 and 9 of the drawings.

When it is desired to check the air pressure within the tire which carries the valve stem 4, the vehicle operator or service station attendant grips the outer housing 100 of the device and forces this outer housing downwardly toward the valve stem 4. This application of force causes relative movement between the outer housing 100 and the sleeve 126 as the sleeve slides within the outer housing. Upon movement of the outer housing 100 downwardly on the inner housing, the shoulder 121 bears against the reactor plate 138 and forces this plate toward the inner housing 126 so as to compress the spring 136 and move the stem depressor shaft 148 into contact with the valve core 143. Continued movement of the outer housing 100 on the inner housing 126 will cause the core to be depressed and allow air to escape from the tire and pass upwardly through the sleeve 126 and through the apertures 14 in the plate 138.

Figure 13:
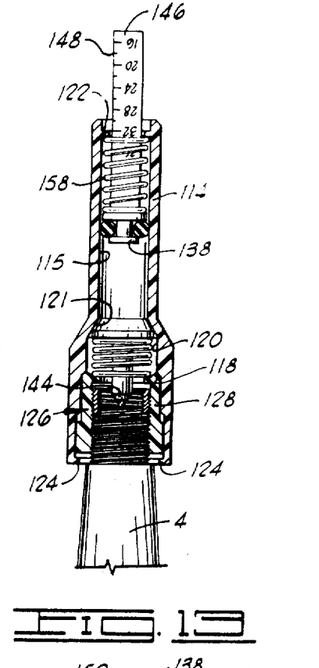
FIG. 13 is a sectional view similar to FIG. 9, but showing the pressure indicator and inflation device of the invention as it appears when it is in a status effective to permit the inflation pressure of a pneumatic tire to which it is attached to be measured.

After air from the tire has passed through the openings or orifices 140 in the reaction plate 138, the air impinges upon the O-ring seal 156 and causes the seal and the pressure indicator assembly of which it forms a part to reciprocate within the outer bore 115 of the elongated neck portion 114. The air pressure in the tire, of course, acts on the opposite side of the O-ring seal 156 from the helical compression spring 158 and in forcing the gauge element 146 of the pressure indicator assembly 144 out of the opening in the end of the elongated neck portion 114, compresses the compression spring 158. When the compression exerted by the spring 158 balances the air pressure in the tire, the movement of the piston formed by the O-ring seal 156 is arrested. At this point, a reading of the pressure graduations 148 or indicia set forth on the gauge element 146 can be made to determine the air pressure within the tire. This status of the pressure indicator and inflation device is depicted in FIG. 13.

After the outer housing 100 has been released after it has been moved downwardly relative to the inner housing 126 to obtain a pressure reading, the spring 136 will expand to force the reaction plate and the entire outer housing 100 outwardly with respect to the valve core, and the relative positions of the inner and outer housings as depicted in FIG. 9 will be reestablished. At this time, the air which is entrapped within the outer housing 100 beneath the O-ring seal 156 may slowly bleed from the outer housing by eventual leakage around the O-ring and also between the inner and outer housings. Therefore, soon after a pressure reading has been taken, it will become possible to press the outer end of the elongated gauge element 146 down into the counterbore 115 to reset the device, either for a subsequent pressure reading, or for inflation or deflation of the tire.

Figures 10, 11, 12, 14:
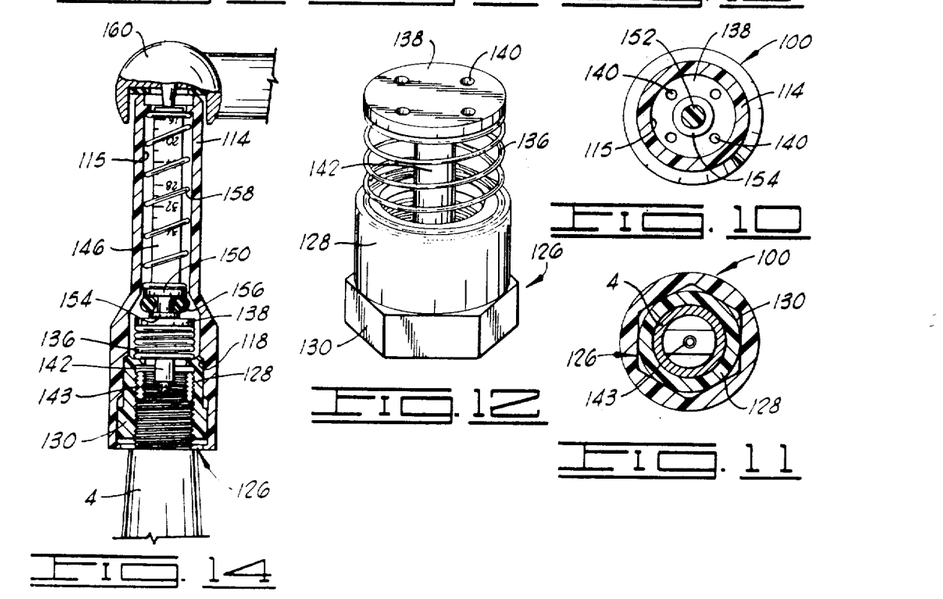
FIG. 10 is a sectional view taken along line 10—10 of FIG. 9.
FIG. 11 is a sectional view taken along line 11—11 of FIG. 9.
FIG. 12 is a perspective view of the inner sleeve and valve depressor element constituting an element of the modified embodiment of the pressure indicating and inflation device illustrated in FIG. 8.
FIG. 14 is a view similar to FIG. 9, but showing an alternate status of the pressure indicator and inflation device as the device is positioned for the purpose of inflating a tire to which it is attached.

The manner in which the pressure indicator and inflation device is utilized for inflating or deflating the tire is best illustrated in FIG. 14. A tire inflation chuck 160 is placed over the open upper end of the elongated neck portion 114 after removal of the friction cap 116. This results in the gauge element 146 being pressed downwardly so as to push the O-ring seal 156 down beyond the tapered shoulder 121. Air can therefore pass from the air inflation hose down through the annulus between the gauge element 146 and the neck portion 114 of the outer housing, and can by-pass the O-ring seal 156 when it is disposed opposite the tapered or beveled shoulder 121. The air can then pass through the openings or orifices 140 formed in the reactor plate 138. It will also be noted in referring to FIG. 14 that at this time, the stem depressor shaft 142 has contacted and depressed the core 143 of the valve stem 4 so that the air under pressure may enter and inflate the tire.

For the purpose of deflating the tire, a similar actuation of the pressure indicator assembly 144 is carried out with any suitable gauge depressing device so that the gauge element is forced downwardly in the outer housing, and the reaction plate 138 is driven downwardly until the stem depressor shaft 142 contacts the valve core 143 and depresses it to permit air to flow out along the pathway previously described.

A number of additional advantages other than those previously described herein characterize the present invention. Thus, the inner housing or insert sleeve 126 is sufficiently soft and resilient that, in assembly, the flange 124 can be pre-formed on the outer housing 100, and the inner housing or insert sleeve then pressed through this constricted opening to resiliently resume its original diameter after it is in place in the outer housing. Of course, the flange 124 at the lower open end of the outer housing 100 can also be formed, if desired, after the insert sleeve 126 is in position within the outer housing, and the hexagonal surfaces of the insert sleeve and the outside housing are engaged.

When the insert sleeve or inner housing 126 is positioned within the outer housing 100, the fit therein is tight enough that the combined walls of the insert sleeve and outer housing have sufficient strength that the threads of the insert sleeve which engage the valve core cannot be stripped or pushed over the threads of the valve core to result in disengagement.

The largest outside diameter of the outer housing 100 is yet made sufficiently small that the inflation device of the invention can fit through all wheel covers. Moreover, use of the friction cap 116 over the outer end of the elongated neck portion 114 results in the device having the appearance of a conventional valve stem extension attached to the tire valve stem and thus discourages theft of the inflation device of the invention.

The construction of the device is such that all internal parts fitted within the outer housing can be inserted therein before the flange 124 is formed near the open end of the outer housing 100. Moreover, the gauge is designed so that all the moving parts thereof can be lubricated by the user simply by squirting a few drops of lubricant into the bottom of the gauge before screwing it on the valve stem. The air pressure will then force the lubricant to all parts in a small amount.

Although certain preferred embodiments of the invention have been herein described in order to fully illustrate the principles of operation which underlie the invention, it is to be understood that various changes and modifications can be effected in the structures described without departure from these basic principles. Changes and innovations of this type are therefore deemed to be circumscribed by the spirit and scope of the invention except as the same may be necessarily limited by the appended claims or reasonable equivalents thereof.

What is claimed is:

1. A pressure indicator and inflation device comprising:
   an outer housing having bore means extending therethrough to openings at opposite ends of the outer housing, and having air passageway means in the internal wall thereof which defines said bore means;
   a resilient inner housing positioned slidably within said outer housing adjacent one end thereof in said bore means, said resilient inner housing being adapted for securement to the valve stem of a pneumatic tire, said inner housing comprising:
      a cylindrical side wall; and
      an end portion integrally formed with said cylindrical side wall and keyed to said outer housing to prevent rotative motion relative thereto;
   a reaction plate having openings therethrough;
   a helical spring positioned between said reaction plate and said cylindrical side wall;
   a core depressor projection projecting from said reaction plate concentrically within said spring and adapted to contact and depress the valve core of a pneumatic tire valve when said helical spring is deformed in resilient deformation;
   piston means slidably positioned within said outer housing for reciprocation in said bore means at a location between said inner housing and the other end of said outer housing;
   spring means in said bore means and extending between said piston means and a portion of said outer housing for resiliently urging said piston means toward said inner housing; and
   a pressure gauge indicator element secured to, and movable with, said piston means, said pressure gauge indicator element projecting from said piston means away from said inner housing and toward said other end of the outer housing and movable through the opening therein.

2. A pressure indicator and inflation device comprising:
   an outer housing having bore means extending therethrough to openings at opposite ends of the outer housing, and having air passageway means in the internal wall thereof which defines said bore means;
   a cylindrical resilient inner housing positioned slidably within said outer housing adjacent one end thereof in said bore means, and adapted for securement to the valve stem of a pneumatic tire, said inner housing comprising:
      a side wall; and
      an end portion connected to said side wall and having a hexagonally shaped outer surface engaging the inner wall of said outer housing;
   an apertured reaction plate;
   resilient means positioned between said reaction plate and said side wall;
   a core depressor projection carried on said reaction plate and projecting along the axis of the inner housing and adapted to contact and bias to an open position, a valve core of a valve stem secured to said end portion at a time when the resilient means is deformed in resilient deformation;
   piston means slidably positioned within said outer housing for reciprocation in said bore means at a location between said inner housing and the other end of said outer housing;
   spring means in said bore means and extending between said piston means and a portion of said outer housing for resiliently urging said piston means toward said inner housing; and
   a pressure gauge indicator element secured to and movable with said piston means, said pressure gauge indicator element projecting from said piston means away from said inner housing and toward said other end of the outer housing and movable through the opening therein.

3. A pressure indicator and inflation device comprising:
- an outer housing having bore means extending therethrough to openings at opposite ends of the outer housing, and having first air passageway means in the internal wall thereof which defines said bore means;
- a cylindrical resilient inner housing positioned slidably within said outer housing adjacent one end thereof in said bore means, and adapted for securement to the valve stem of a pneumatic tire, said inner housing having second air passageway means therethrough; an apertured reaction plate; resilient means positioned between said reaction plate and said inner housing;
- a core depressor projection carried on said reaction plate and projecting along the axis of the inner housing and adapted to contact and bias to an open position a valve core of a valve stem secured to said end portion at a time when the resilient means is deformed in resilient deformation;
- piston means slidably positioned within said outer housing for reciprocation in said bore means at a location between said inner housing and the other end of said outer housing, said piston means comprising:
- an annular plate;
- a seal retainer plate;
- a connector neck interconnecting said annular plate and seal retainer plate; and
- an annular O-ring seal positioned around said connector neck and sealingly engaging the internal wall of said outer housing defining said bore means;
- spring means in said bore means and extending between said piston means and a portion of said outer housing for resiliently urging said piston means toward said inner housing; and
- a pressure gauge indicator element secured to, and movable with, said piston means, said pressure gauge indicator element projecting from said piston means away from said inner housing and toward said other end of the outer housing and movable through the opening therein.

* * * * *